United States Patent [19]

Fermanich

[11] Patent Number: 4,532,951

[45] Date of Patent: Aug. 6, 1985

[54] TRANSDUCER UTILIZING ELECTRICAL AND PNEUMATIC SIGNALS

[75] Inventor: Raymond J. Fermanich, Rockford, Ill.

[73] Assignee: Barber-Colman Company, Rockford, Ill.

[21] Appl. No.: 479,657

[22] Filed: Mar. 28, 1983

[51] Int. Cl.[3] ............................................. G05D 16/00

[52] U.S. Cl. ......................................... 137/84; 137/85; 251/129.15

[58] Field of Search ............................ 137/82, 85, 84; 251/141, 65

[56] References Cited

U.S. PATENT DOCUMENTS 2,983,278 5/1961 Heintz .................................. 137/82

3,244,190 4/1966 Taylor .................................. 137/85

3,393,694 7/1968 Baker ............................... 251/65 X 3,446,472 5/1969 Freeman ............................... 251/65

4,306,589 12/1981 Harned ............................ 251/65 X 4,325,399 4/1982 Frick .................................... 137/85

*Primary Examiner*—Alan Cohan

*Attorney, Agent, or Firm*—Leydig, Voit, Osann, Mayer & Holt

[57] ABSTRACT

An electrical-pneumatic transducer includes a pneumatic relay in which the pressure of the air at the outlet varies in accordance with the back pressure of the air at a bleed nozzle in the relay. This back pressure is changed by the armature of a solenoid with the armature opposing the nozzle outlet and being urged toward the latter with a force responsive to a signal in the form of current flowing through the solenoid coil. The magnitude of the current is correlated with the magnitude of a variable condition. The force on the armature, which is a permanent magnet, is selectively set to calibrate the transducer by means of a second permanent magnet which is axially aligned with the armature and is adjustably movable toward and away from the latter.

11 Claims, 1 Drawing Figure

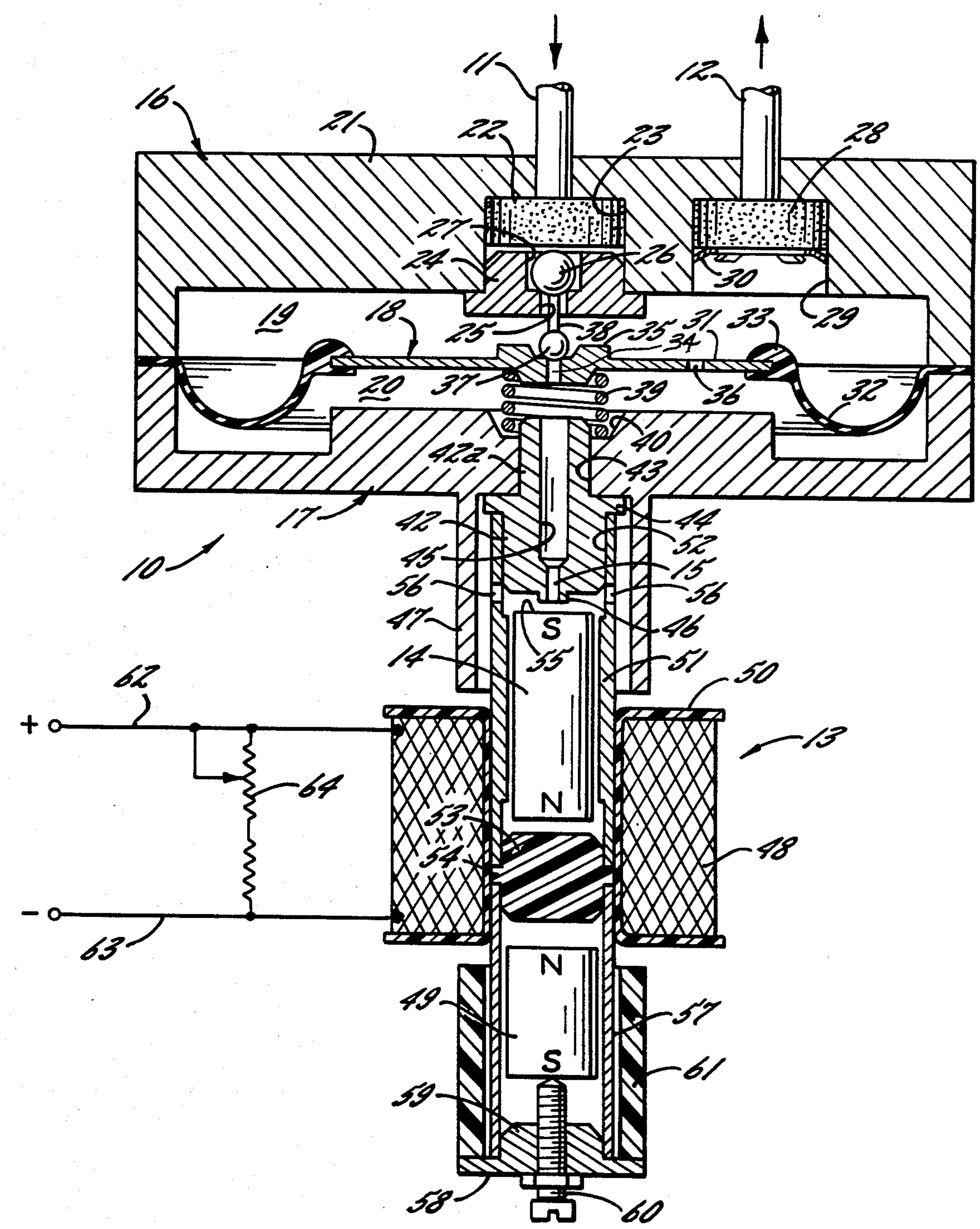
11
12
16
21
22
23
28
27
24
26
30
29
19
18
25
38
35
31
33
34
20
37
39
36
32
42a
40
43
17
44
42
52
45
15
10
56
56
47
46
55
S
14
51
62
50
+
13
64
N
53
54
48
-
63
N
49
57
S
61
59
58
60

TRANSDUCER UTILIZING ELECTRICAL AND PNEUMATIC SIGNALS

BACKGROUND OF THE INVENTION

The present invention relates to a transducer of the type in which the magnitude of an input signal produces a corresponding change in the output signal of a relay. In its more detailed aspects, the invention relates to an electrical-pneumatic transducer wherein the magnitude of an electrical signal produces a corresponding change in the pressure at the outlet of a pneumatic relay. Customarily, the signal magnitude is responsive to changes in a variable condition and the output of the relay is used to control the magnitude of that condition. The relay is of the type in which the pressure of the air at the outlet is varied in accordance with the back pressure at the bleed nozzle and that pressure is determined by the force on a member movable relative to the nozzle and hence by the position of the member. An example of such a relay is shown in Taylor U.S. Pat. No. 3,244,190. The force on the movable member is correlated with the magnitude of the electrical signal through the medium of a signal-to-force transducer such as a solenoid.

SUMMARY OF THE INVENTION

The general object of the present invention is to utilize a solenoid as a means for producing one of the signals and to arrange the solenoid in a novel manner so that its armature opposes the bleed nozzle and force on the armature balances the back pressure at the nozzle.

Another object is to utilize a solenoid as the signal-to-force transducer and to arrange the solenoid in a novel manner relative to the pneumatic relay to achieve an improved response to the output of the relay to the magnitude of the signal to the solenoid.

A more detailed object is to achieve the foregoing by arranging the solenoid relative to the relay so that the armature of the solenoid opposes the nozzle and is itself the member which moves in response to the signal and which directly controls the flow of air out of the nozzle and thereby controls the back pressure at the nozzle.

Another object is to provide an electrical-pneumatic transducer which is easily calibrated simply by manually adjusting the position of an auxiliary permanent magnet relative to the permanent magnet which is the core of the solenoid.

The invention also resides in the novel construction and arrangement of the solenoid, the auxiliary magnet and the associated parts.

BRIEF DESCRIPTION OF THE DRAWING

The drawing is a longitudinal sectional view of an electrical-pneumatic transducer embodying the present invention.

DETAILED DESCRIPTION OF THE PREFERRED EMBODIMENT

As shown in the drawing for purposes of illustration, the invention is embodied in an electrical-pneumatic transducer in which an input signal responsive to a variable condition such as temperature produces an output signal which is proportional to the magnitude of the input signal and controls the variable condition. Herein, the input is an electrical signal responsive to the condition and produces an output signal in the form of a pneumatic pressure output which is proportional to the magnitude of the electrical signal and controls the variable condition. More specifically, the transducer includes a pneumatic relay 10 which receives supply pressure fluid such as air under pressure through an inlet 11 and which delivers air through an outlet 12 at a control pressure correlated with the variable condition as reflected by the magnitude of the signal received by an electrical signal-to-force transducer 13. The latter urges a member 14 relative to a bleed nozzle 15 to control the flow of air through the nozzle and the resulting back pressure regulates the pressure of the air at the outlet 12.

In the present instance, the relay 10 is enclosed in a housing composed of two cup-shaped parts 16 and 17 which are molded from a rigid non-magnetic material and which oppose each other and are fastened together. A diaphragm 18 is clamped between the parts to divide the interior of the housing into chambers 19 and 20. The inlet 11 is in the form of a conduit projecting axially through the end wall 21 of the housing part 16 and the outlet 12 is a parallel conduit radially offset from the inlet and also extending through the wall 21. Air entering the chamber 19 through the inlet passes through a filter 22 seated in the upper end of a bore 23 which is coaxial with the inlet and the housing. A plug 24 projects upwardly into the lower end of the bore and is formed with an inlet port 25 which is closed by a spherical valve 26 disposed in a counterbore 27 in the upper end of the plug. A filter 28 similar to the filter 22 is disposed in a second bore 29 at the inner end of the outlet conduit 12 and is held in place by a spring washer 30.

The diaphragm 18 includes a central metal disk 31 and a flexible annulus 32 made of a material such as rubber. A bead 33 at the inner edge of the annulus is bonded to the periphery of the disk and the outer edge portion of the annulus is clamped between the housing parts 16 and 17. A port 34 extends centrally through the disk and is surrounded by a valve seat as defined by an annular boss 35 on the upper side of the disk. The chamber 19 communicates with the chamber 20 through the port 34 and also through a restricted orifice 36 in the diaphragm disk 31. A ball valve 37 disposed above the disk cooperates with the port 34 to open and close the latter and this valve is rigidly connected to the valve 26 by a stem 38 so that the two valves move in unison. A coiled compression spring 39 acts between the underside of the disk 31 and the bottom of a well 40 formed in the inside of the housing part 17 and the spring is operable to urge the diaphragm 18 upwardly.

To provide the nozzle 15, the reduced upper end portion 42*a* of a cylinder 42 projects up through an axial bore 43 in the part 17 of the valve housing and the cylinder is positioned by a radial flange 44 which is formed on the cylinder and abuts the underside of the part 17. A central passage 45 extends downwardly from the upper end of the cylinder and, at its lower end, the passage communicates with the restricted nozzle 15, the latter opening downwardly through an axial boss 46. A cylindrical skirt 47 molded integrally with the housing part 17 projects downwardly therefrom around and beyond the cylinder 42 to shield the nozzle from dust. The member 14 is disposed outside the housing 16, 17 and is urged toward and away from the boss 46 to vary the flow of air out through the nozzle 15.

With the foregoing arrangement, a change in the variable condition which urges the member 14 toward the nozzle 15 reduces the flow of air out of the chamber 20 through the nozzle. As a result, air tends to flow from the chamber 19 through the orifice 36 to the chamber 20 faster than the air flows out of the latter chamber so that pressure in this chamber increases. This increase in pressure moves the diaphragm 18 upwardly and the latter, acting through the valve 37 and the stem 38, lifts the valve 26 away from the port 25. With this port open, air from the inlet 11 increases the pressures in the chamber 19 and of the air delivered through the outlet 12 and these pressures will increase until the pressure in the chamber 19 is effective to return the diaphragm to the equilibrium position in which the valve 37 closes its port 34 and the valve 26 allows a low level of air flow at the seat 25 to replenish the air flowing out through the nozzle. Equilibrium also is achieved by the variable condition being changed to reduce the force of the member 14 toward the nozzle 15.

Should the variable condition change in a direction to urge the member 14 away from the nozzle 15, air will exhaust through the nozzle at a faster rate and lower the pressure in the chamber 20. Thus, the greater pressure in the chamber 19 flexes the diaphragm 18 downwardly and, because the valve 37 cannot move downwardly due to the seating of the valve 26, this opens the port 34. As a result, the air flow from the chamber 19 to the chamber 20 is increased causing a decrease in pressure in the chamber 19 and hence at the outlet 12 and this continues until the forces on the diaphragm equalize.

The present invention contemplates the novel cooperation of a solenoid and the relay 10 so that one signal of the transducer is electrical and the other signal is a pneumatic pressure. More particularly, the invention has to do with the use of the armature of the solenoid to exert a force which opposes the pressure at the bleed nozzle 15 so that the output signal responds quickly and accurately to the magnitude of the variable condition as measured by the magnitude of the signal of the transducer. To these ends, the transducer 13 is a solenoid with a coil 48 coaxial with the nozzle 15 and the member 14 is a permanent magnet and is the armature of the solenoid. Also, according to the invention, a second permanent magnet 49 is utilized in a novel manner to coact with the armature magnet 14 and adjust the position of the latter under preselected conditions thereby to calibrate the electrical-pneumatic transducer.

In the present instance, the coil 48 is wound on a spool 50 which is made of a non-magnetic and non-conductive material such as plastic and which is received on a tube 51 of non-magnetic material such as brass. The internal diameter of the tube along the upper end portion of the latter is enlarged as indicated at 52 and this end portion is fitted on the lower end portion of the cylinder 42 with the upper end of the tube abutting the flange 44. The lower end of the tube 51 is closed by a non-magnetic spacer or plug 53 whose upper half is fitted into the tube with a central radial flange 54 abutting the bottom of the tube. The latter projects only partially into the spool 50 and the upper portion of the magnet 14 is disposed above the coil 48 while the lower portion is within the coil. The armature magnet 14 is cylindrical in shape and is sized to move freely or, in a sense, to float up and down in the tube toward and away from the nozzle 15. The poles of the magnet 14 are located at the opposite ends thereof. In use, the polarity of the magnet relative to the direction of current flow in the coil 48 may be such that an increase in the current urges the magnet toward the nozzle whereby the pressure at the outlet 12 is increased. Such urging in this case is against the force of the nozzle back pressure and this force urges the magnet away from the nozzle when the current in the coil is decreased. On the other hand, the polarity of the armature magnet relative to the direction of current flow in the coil 48 may be such that an increase in current urges the magnet away from the nozzle whereby the pressure at the outlet 12 decreases. Such urging then is against the force of the calibration magnet and the latter urges the armature magnet toward the nozzle. Advantageously, at least the upper end surface 55 of the magnet is flat so as to maintain a constant attitude relative to the nozzle and this, together with the linear relationship between the coil current and the force on the magnet, produces a linear response of the relay 10 to changes in the magnitude of the current in the coil. Ports 56 are formed in the tube 51 immediately below the cylinder 43 to prevent a build up of pressure in the tube.

The calibration magnet 49 is disposed end to end with the armature magnet 14 and is selectively movable endwise toward and away from the magnet 14 so that, due to the relative polarities of the two magnets, the position of the calibration magnet determines the effective force of the armature magnet. In the preferred embodiment, the magnet 49 is disposed beneath the magnet 14 and the adjacent ends of the two magnets are of like polarity. As a result, the calibration magnet has a tendency to force the armature magnet toward the nozzle and this tendency is increased as the calibration magnet is moved closer to the armature magnet. In other words, the armature magnet reaches a point of equilibriun where the back pressure at the nozzle 15 plus gravity equals the sum of the forces of the coil 48 and of the calibration magnet. As illustrated in the drawing, for example, the adjacent ends of the magnets may be north poles and the opposite ends are south poles. It should be understood that, if the assembly is inverted, the force of gravity tends to move the armature toward the nozzle and the magnetic forces are calibrated to take this into account.

Herein, the calibration magnet 49 is cylindrical with a diameter approximately equal to the diameter of the armature magnet 14 and the magnet 49 is disposed in a second brass tube 57 which is coaxial with the tube 51 to form a continuation of the latter and which is telescoped over the lower half of the plug 53 to abut the flange 54. An end cap 58 is formed with a central boss 59 which is fitted into the lower end of the tube 57 and a screw 60 coaxial with the tube is threaded up through the cap and abuts the underside of the calibration magnet. Thus, by turning the screw back and forth, the magnet 49 is moved up and down so as to adjust the force on the armature magnet 14 for proper calibration of the transducer. A non-magnetic sleeve 61 encircles the lower end portion of the tube 57. The coil 48 is energized through leads 62 and 63 and is calibrated by a variable shunt resistance 64.

Without interfering with the calibrating effect of the magnet 49 on the magnet 14, the plug 53 prevents the two magnets from touching each other thereby reducing the possibility of the magnets becoming demagnetized. In addition, air from the nozzle 15 can flow through the space between the armature magnet and the tube 51 and the plug 53 and cause a pressure build up of this air beneath the magnet to produce a damping action which prevents undesired oscillation of the magnet.

Typical values used in the design of a transducer shown in the drawing include a spring 39 which is balanced with a pressure differential of 0.2 pounds per square inch on opposite sides of the diaphragm 18, an input signal through the coil 48 of between four and twenty milliamps and an output pressure at the outlet 12 in the range of three to fifteen pounds per square inch gauge. It should be understood that the movement of the armature magnet 14 is so small as to be almost imperceptible and, in a typical construction, this movement is in the order of 50 millionths of an inch or less.

It will be observed that, with a transducer as described above, the armature 14 of the solenoid 13 coacts directly with the nozzle 15 to vary the pressure at the outlet 12. This and the use of the flat surface 55 enhance the linearity of the response of the outlet pressure to the signal in the coil 48. Further, the use of the adjustable magnet 49 provides a simple and effective means for calibrating the transducer.

I claim:

1. An electrical-pneumatic transducer having, in combination, a housing having a supply pressure inlet, a control pressure outlet and a regulating nozzle, said inlet being adapted for connection to a source of fluid under pressure, means disposed within said housing and operable to regulate the pressure of fluid at said outlet in response to the rate of fluid flow through said nozzle, a first elongated permanent magnet disposed coaxially with said nozzle, the ends of said magnet being of different polarity with one end of the magnet opposing the nozzle, a coil of electrically conductive wire disposed outside said housing coaxially with said nozzle and encircling at least a portion of said magnet, said magnet being urged axially endwise relative to said nozzle to vary the rate of fluid flow through the latter and being urged by the energization of said coil whereby the force on the magnet is correlated with the degree of energization of the coil and the pressure at said outlet is correlated with said force, a second elongated permanent magnet disposed end to end with said first magnet and spaced from the latter, the ends of said second magnet being of different polarity and oriented relative to said first magnet to urge said first magnet in an endwise direction, and means for manually moving said second magnet toward and away from said first magnet to vary the effect of the second magnet on the first magnet thereby to calibrate the transducer.

2. An electrical-pneumatic transducer as defined in claim 1 in which said nozzle extends along a vertical axis, said first magnet being urged in said one direction by said coil against the action of gravity, and said second magnet acting against the effect of gravity on said first magnet.

3. An electrical-pneumatic transducer as defined in claim 2 including an elongated tube made of a non-magnetic material and disposed outside said housing coaxially with said nozzle, one end of said tube being adjacent said nozzle and said first magnet being inside said tube and freely movable therein.

4. An electrical-pneumatic transducer as defined in claim 3 in which said second magnet is disposed within a continuation of said tube.

5. An electrical-pneumatic transducer as defined in claim 4 including a plug in the outer end of said continuation of said tube and said means for manually moving said second magnet is a screw threaded through said plug and engaging the lower end of said second magnet.

6. An electrical-pneumatic transducer as defined in claim 4 in which said one end of said first magnet is flat.

7. An electrical-pneumatic transducer as defined in claim 4 in which the polarity of the adjacent ends of said first and second magnets is the same.

8. An electrical-pneumatic having, in combination, a housing having a supply pressure inlet, a control pressure outlet and a vertical nozzle, said inlet being adapted for connection to a source of fluid under pressure, means disposed within said housing and operable to regulate the pressure of fluid at said outlet in response to the rate of fluid flow through said nozzle, an elongated vertical tube disposed outside said housing and coaxially with said nozzle, a first elongated permanent magnet disposed in said tube adjacent said nozzle, the ends of said magnet being of different polarity with one end of the magnet opposing the nozzle, a coil of electrically conductive wire disposed outside said housing coaxially with said nozzle and encircling a portion of said tube and at least a portion of said magnet, said magnet being urged endwise in said tube toward said nozzle to vary the rate of fluid flow through the latter, said magnet being urged in one direction by the pressure of the fluid at the nozzle and in the other direction by the energization of said coil whereby the axial force on the magnet is correlated with the degree of energization of the coil and the pressure at said outlet is correlated with said force, a second elongated permanent magnet disposed end to end with said first magnet and spaced beneath the latter, the ends of said second magnet being of different polarity and the adjacent ends of said two magnets being of the same polarity whereby said second magnet acts against the effect of the nozzle pressure on said first magnet, means for supporting said second magnet for movement toward and away from said first magnet, and a threaded member engaging the outer end of said second magnet and operable to move the latter toward said first magnet or permit the second magnet to move away from the first magnet thereby to vary the effect of the second magnet on the first magnet and calibrate the transducer.

9. An electrical-pneumatic transducer as defined in claim 8 in which said means for supporting said second magnet is a continuation of said tube and said second magnet is in said continuation.

10. An electrical-pneumatic transducer as defined in claim 8 including a spacer made of non-magnetic material disposed in said tube below said first magnet and above said second magnet.

11. An electrical-pneumatic transducer as defined in claim 10 in which said spacer closes said tube at a point beneath said first magnet to cause a build up of fluid pressure between the spacer and the first magnet.

* * * * *